350-3.66
XR 3,636,249
TX 3039E
X 3038N

United Stat
Larsen

[15] 3,636,249
[45] Jan. 18, 1972

[54] HETERODYNE SCANNING SYSTEM FOR HOLOGRAM TRANSMISSION

[72] Inventor: Arthur B. Larsen, Colts Neck, N.J.
[73] Assignee: Bell Telephone Laboratories, Incorporated, Murray Hill, N.J.

[22] Filed: July 28, 1969
[21] Appl. No.: 845,230

[52] U.S. Cl. ......................................178/6.5, 350/3.5
[51] Int. Cl. ......................................H04n 9/56
[58] Field of Search ......................................350/3.5; 178/6.5

[56] References Cited

OTHER PUBLICATIONS

Neumann– Improvement of Recorded Holographic Fringes by Feedback Control– Applied Optics– June 1967– Vol. 6, No. 6, pp. 1097– 1104.

*Primary Examiner*—Robert L. Griffin
*Assistant Examiner*—Joseph A. Orsino, Jr.
*Attorney*—R. J. Guenther and E. W. Adams, Jr.

[57] ABSTRACT

A hologram heterodyne scanner wherein a stationary coherent light beam illuminates the subject and is then optically relayed via a beamsplitter to a photodetector. The other phase-locked optical frequency, needed for the reference beam, is derived from the first-mentioned beam by means of a Doppler technique. The Doppler-shifted reference beam is orthogonally disposed with respect to the stationary beam and it is likewise relayed to the photodetector via the beamsplitter. The reference beam is focused to define a small spot and the latter is raster scanned with respect to the stationary beam. A random interlace scan is utilized, which helps to eliminate the scanning structure from the hologram. The photodetector is purposely placed at an out-of-focus location with respect to the locus of the scanning beam waist.

7 Claims, 4 Drawing Figures

3636249 OR CASSIF

PATENTED JAN 18 1972

3,636,249

SHEET 1 OF 2

INVENTOR
A. B. LARSEN
BY John K. Mullarney
ATTORNEY

HETERODYNE SCANNING SYSTEM FOR HOLOGRAM TRANSMISSION

BACKGROUND OF THE INVENTION

This invention relates to holography and, more particularly, to a heterodyne scanning system for hologram transmission.

Hologram transmission over an electrical channel is of interest not only because of the obvious desirability of being able to transmit three-dimensional images but also because of the possible use of some type of hologram transmission to provide a new error-resistant coding technique for the transmission of two-dimensional information.

Several techniques have been proposed, for hologram transmission, which use a scanning coherent light beam to produce an electrical signal that corresponds to a scanned hologram. The hologram itself is not formed at the transmitting end of the system as a physical entity, rather a modulated electrical carrier frequency corresponding to the spatial carrier frequency of the hologram is generated by heterodyning. Such a technique is set forth in the article "Hologram Heterodyne Scanners" by L. H. Enloe, W. C. Jakes, and C. B. Rubinstein, *Bell System Technical Journal*, Vol. 47, No. 9, Nov. 1968, pages 1875–1882. Briefly, in accordance with this technique, heterodyning is accomplished by scanning a focused spot of coherent light over a photodetector that is positioned to receive a portion of the coherent light which illuminates the subject or object. The time-varying interference between the constant amplitude scanning spot and the object beam causes fluctuations in the photodetector output which are transmitted, and, at the receiver, serve to intensity modulate a video display, e.g., a kinescope.

In the above arrangement, the sensitive surface of the photodetector is placed at the locus of the scanning beam waist. This presents certain operational limitations, it necessitates the careful positioning of the detector, and it is noisy due to the effects of dust particles and other local anomalies of the detector surface.

It is a primary object of the present invention to overcome the above shortcomings of prior art hologram heterodyne scanners by purposely disposing the photodetector(s) at an out-of-focus location with respect to the scanning beam waist.

While the transmission of holograms over a television-type transmission system presents no conceptual difficulties, practical obstacles, such as the bandwidth capacity required and the resolution capabilities of the receiver apparatus, still remain.

It is accordingly a further object of the invention to provide a hologram heterodyne scanning system which requires less transmission bandwidth and which makes optimum use of the resolution capabilities of the receiver apparatus.

SUMMARY OF THE INVENTION

The above and other objects are attained in accordance with the present invention wherein a stationary coherent light beam illuminates the subject and is then optically relayed via a beamsplitter to one or more photodetectors. The other phase-locked optical frequency, needed for the reference beam, is derived from the first-mentioned beam by means of a Doppler-shift technique. The Doppler-shifted reference beam is orthogonally disposed with respect to the stationary beam and it is likewise relayed to the photodetector(s) via the beamsplitter. The reference beam is focused so as to define a small spot and the latter is raster scanned with respect to said stationary beam. The photodetector(s) is located at an arbitrary out-of-focus position with respect to the scanning beam waist, i.e., the detector output is independent of its position, provided all of the area common to both beams is intercepted. The plane of the resulting hologram is the locus of the scanning beam waist.

In accordance with a feature of the invention the raster scan is of a random interlace nature, which, in conjunction with a "time exposure," serves to eliminate the scanning structure from the hologram.

BRIEF DESCRIPTION OF THE DRAWINGS

A complete understanding of the present invention and of the above and other objects and features thereof can be gained from a consideration of the following detailed description when the same is read in conjunction with the accompanying drawings in which.

DETAILED DESCRIPTION

Figure 1A:
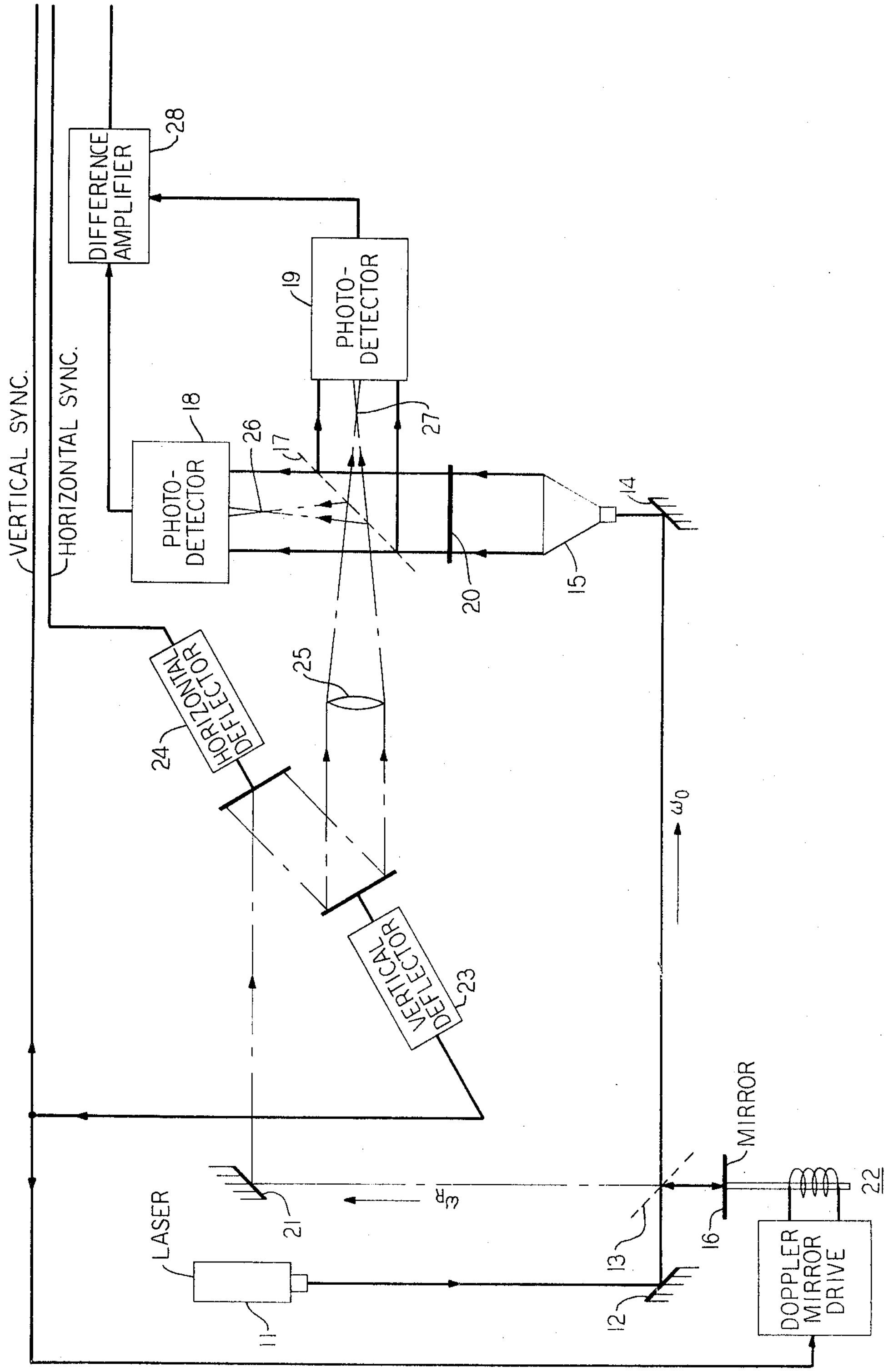
FIG. 1A and 1B, when placed as shown in FIG. 2, comprise a simplified schematic diagram of a hologram transmission system embodying the principles of the present invention.
Figure 2:
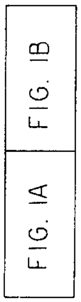
Figure 1B:
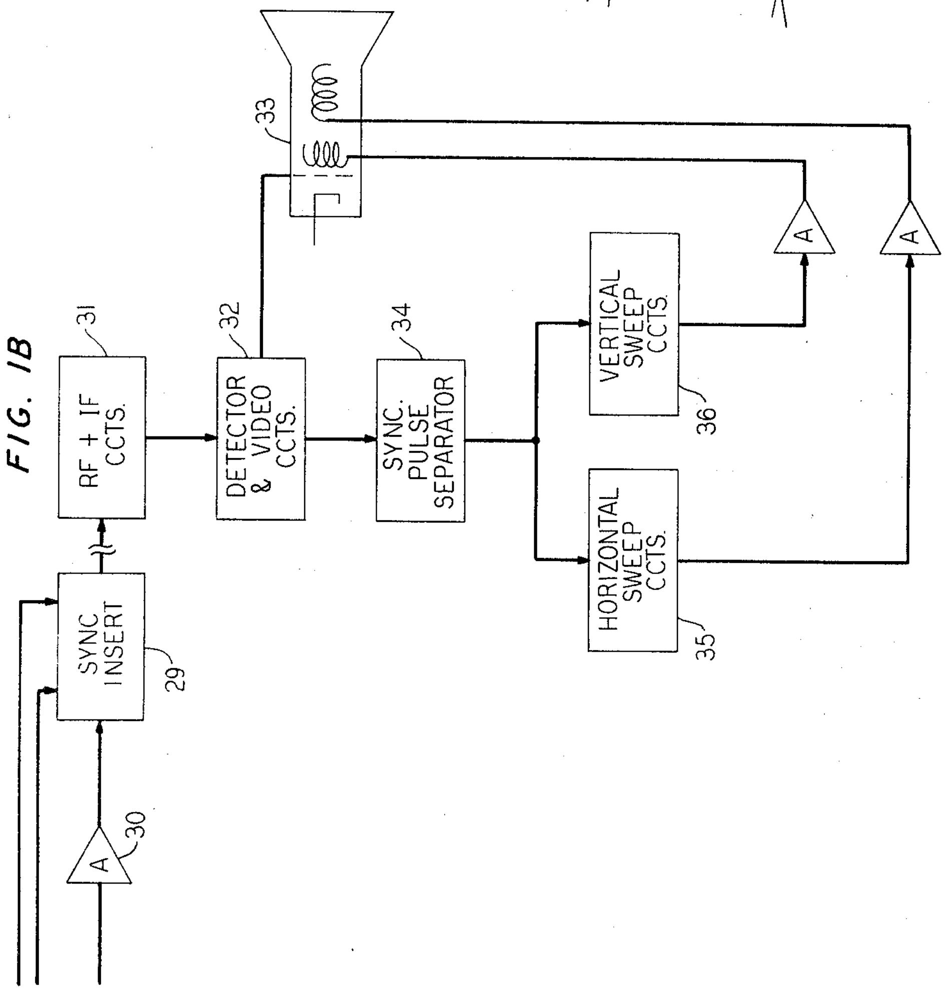

Referring now to the drawings, FIGS. 1A and 1B show in simplified schematic form (1) transmitting apparatus for generating an alternating current signal that is modulated in phase and amplitude in accordance with the holographic information related to the subject or object under investigation and (2) a typical receiver useful in the hologram reconstruction process. The transmitting apparatus comprises a source of monochromatic coherent light 11 such as a laser, a mirror 12, a conventional beamsplitter 13, a second mirror 14 and an optical lens package 15. The beamsplitter 13 serves to transmit therethrough approximately half of the impinging coherent light, while reflecting the other approximate half to mirror 16 for the purpose to be described. Since the light beam from the laser is dimensionally small (e.g., a diameter of approximately 2 millimeters) a series of lenses (i.e., lens package 15) is utilized to insure that the entire subject or object 20 under investigation is illuminated by the coherent light ($\omega_O$) from laser source 11. The subject-illuminating beam is stationary. The beamsplitter 17 serves to optically relay, by through transmission and reflection, the subject-illuminating beam toward the photodetectors 18 and 19. This beamsplitter is similar to beamsplitter 13. The subject or object (e.g., a two-dimensional transparency 20) is placed in the path of the stationary beam at some position intermediate the lens package 15 and beamsplitter 17. This position is not critical.

The other, phase-locked, optical frequency ($\omega_R$) is derived in accordance with the invention by a Doppler technique. The coherent light reflected by beamsplitter 13 is reflected at normal incidence from the moving mirror 16. This introduces a Doppler shift. Approximately half of this Doppler-shifted light is then passed by the beamsplitter 13 to mirror 21. The other half of the Doppler-shifted light is reflected back toward mirror 12 and thus, in effect, it is lost, i.e., it serves no useful function.

The Doppler mirror drive 22, shown symbolically in FIG. 1A, comprises a conventional electrodynamic movement analogous to that utilized in loudspeaker assemblies. Such an arrangement may typically comprise a coil (commonly called a voice coil in the loudspeaker art) located in a strong magnetic field. The coil carries the current which is to be transformed, in this case, into a mirror movement. The action of the magnetic field on the coil current produces a mechanical force that serves to move the mirror 16 in a manner analogous to the vibrations of the typical loudspeaker cone. As shown in FIG. 1A, the drive current can be derived from the vertical deflector 23, or, alternatively, from the horizontal deflector. The former is preferred since vertical deflection is at a lower frequency.

This Doppler technique presents several advantages, First, it is simple and considerably less expensive than the various phase-lock loop techniques heretofore utilized in this art for deriving the different, phase-locked, optical frequencies ($\omega_O$ and $\omega_R$). And this simplicity is achieved without any sacrifice in operational reliability. Second, the frequency difference ($\omega_O - \omega_R$) is small, typically 1 MHz. or less. And when the value of ($\omega_O - \omega_R$) is small, less transmission bandwidth is required, and an optimum use of the resolution capabilities of the receiver apparatus can be realized.

The reference beam of coherent light, reflected from mirror 21, is deflected in a raster scan by deflectors 23 and 24 and it is then focused by a lens system, illustrated by lens 25, to form the scanning spots 26 and 27. As shown in FIG. 1A, these scanning spots lie some distance in front of the respective photodetectors 18 and 19. That is, each detector is at an out-of-focus location with respect to the scanning beam waist of the impinging reference beam. As will be covered in detail hereinafter, this positioning of the detectors presents several advantages over the in-focus prior art arrangements, such as disclosed in the Enloe et al. article, supra. The exact location of each detector with respect to the scanning beam waist is not critical. In fact, each detector can be placed either in front or in back of the scanning beam waist. With a detector positioned in front of the waist position, the focused beam is, of course, interrupted before the waist can be defined. Nevertheless, the desired heterodyne action still takes place. This will be more evident hereinafter.

The aforementioned raster scan can be carried out mechanically with rotating optical mirrors, by various electro-optical arrangements known in the art, or by the known acousto-optical deflection arrangement which operates on the principle of Bragg diffraction.

In an apparatus embodiment constructed in accordance with the present invention, the first, horizontal deflection was performed by an American Time Products torsional optical scanner operating at 7.2 kHz. This unit has a clear aperture of 2 millimeters radius and provides a 6° peak-to-peak scan. The line scan thus formed was then deflected vertically by a second scanner of similar nature. The latter unit had a clear aperture radius of 8 mm. with a 15° peak-to-peak deflection at 60 Hz. It should be understood, however, that the invention is in no way limited to this particular deflection apparatus and other deflection apparatus known in the art can also be advantageously utilized herein.

As will be appreciated by those in the art, the horizontal and vertical deflections can be sinusoidal or linear in nature. With sinusoidal deflection, a sine wave signal will be delivered to the Doppler mirror drive 22. The Doppler-shift will, therefore, vary sinusoidal, but this is substantially compensated for by the fact that the sweep deflection rate will also change as a sine wave function. With a linear deflection, a sawtooth wave will be delivered to drive 22. The Doppler-shift, in this case, will be constant, excepting of course the flyback period which is typically blanked at the receiver. A linear deflection is preferable, but the apparatus required to produce the same is of greater complexity than that needed to produce a sinusoidal deflection. In any event, the invention is in no way limited to any particular type deflection or deflection apparatus.

In accordance with a feature of the invention the raster scan is of a random interlace nature. The use of a random interlace scan, in conjunction with a long "time exposure," serves to eliminate the scanning structure from the hologram. This will be elaborated on hereinafter. This random interlace is achieved by operating the deflectors 23 and 24 nonsynchronously; that is, rather than synchronizing the vertical and horizontal deflector oscillations to each other, as has been the case heretofore, the deflectors are operated in a free-running mode and neither is phase-locked to the other.

The lens system 25 must be capable of defining a scanning beam waist sufficiently small as to resolve the highest spatial frequency of the subject beam. As will be evident to those in the art, this is a necessity even though the waist is not, in fact, formed when a detector is placed in front of the waist position. With the subject illuminating beam at 6328 A., for example, the scanning beam waist should preferably be of the order of 30 microns or less.

The beamsplitter 17 serves to combine the object and reference beams and to optically relay the same to the photodetectors 18 and 19 in the manner illustrated in FIG. 1A. The photodetectors may comprise large area silicon photodiodes, photomultiplier tubes, or any other device known in the art which takes impinging light rays and converts the same to electrical signal current, or voltage. The rays of the scanning beam and of the stationary beam that illuminates the subject interfere constructively and destructively with each other (i.e., they "heterodyne") at each photodetector and corresponding current will be developed. This current will comprise a carrier that is modulated in phase and amplitude in accordance with the interference that occurs between the two beams.

The photodetectors 18 and 19 are connected to the difference amplifier 28 in a conventional "balanced modulator" configuration. While only a single detector is really necessary, the pair of detectors, connected in the balanced configuration, provides a better signal-to-noise ratio.

The sensitive surface of the photodetector has, heretofore, been placed at the locus of the scanning beam waist, and it is, perhaps, still convenient to consider the detection process to occur there. However, it has been found by applicant that this particular location is unnecessary. As can be shown, the detected beat signal is independent of detector position provided the detector intercepts all of the area common to both beams.

Consider a volume (such as that defined by the surface $C$, in FIG. 3) containing no optical sources or sinks and having a boundary that is everywhere in free space. Under these conditions, Poynting's theorem for any incremental volume in this region can be written:

$$\nabla\cdot\vec{S}+\frac{\partial W}{\partial t}=0 \qquad (1)$$

where $\nabla$ is the divergence symbol, $S=ExH$, and $W=(\epsilon/2)\ E^2+(\mu/2)\ H^2$ and is the total energy within the volume defined by surface $C$. $E$ and $H$, the resultant real electric and magnetic fields produced by the combination of the two beams, can be written as the sum of the single frequency real fields corresponding to each beam:

$$\vec{E}=\vec{E}_1e^{j\omega_1t}+\vec{E}_1^*e^{-j\omega_1t}+\vec{E}_2e^{j\omega_2}+\vec{E}_2^*e^{j\omega_2t}$$

$$\vec{H}=\vec{H}_1e^{j\omega_1t}+\vec{H}_1^*e^{-j\omega_1t}+\vec{H}_2e^{j\omega_2t}+\vec{H}_2^*e^{-j\omega_2t} \qquad (2)$$

where $\omega_1$ and $\omega_2$ may or may not be equal. Substituting the values of $E$ and $H$ from Equation (2) into Equation (1) and comparing beat terms varying as $e^{j(\omega_1-\omega_2)t}$, we have:

$$\nabla\cdot(\vec{E}_1\times\vec{H}_2^*+\vec{E}_2^*\times\vec{H}_1)=-j(\omega_1-\omega_2)(\epsilon\vec{E}_1\cdot\vec{E}_2^*+\mu\vec{H}_1\cdot\vec{H}_2^*) \qquad (3)$$

Equation (3) rewritten in the integral form gives:

$$\oiint_C(\vec{E}_1\times\vec{H}_2^*+\vec{E}_2^*\times\vec{H}_1)\cdot d\vec{A}=-j(\omega_1-\omega_2)\iiint_V(\epsilon\vec{E}_1\cdot\vec{E}_2^*+\mu\vec{H}_1\cdot\vec{H}_2^*)\,dV \qquad (4)$$

where the surface $C$ encloses the volume of integration V. A photodetector intercepting these fields will provide a beat signal current ($I\,b$) having a complex amplitude given by:

$$I_b=K\iint_D(\vec{E}_1\times\vec{H}_2^*+\vec{E}_2^*\times\vec{H}_1)\cdot d\vec{A} \qquad (5)$$

where $D$ is the area of the detector and $K$ incorporates several physical constants. The left-hand side of Equation (4) is now recognized as giving, within a constant multiplier, the response of a detector intercepting all of the beat energy crossing the surface $c$. For the case where $\omega_1=\omega_2$, the right-hand side of Equation (4) is identically zero. Under appropriate conditions (i.e., when $$\Delta z\ll\frac{\pi c}{2(\omega_1-\omega_2)}$$

with $c$ being the velocity of light), it is possible for the right-hand side of Equation (4) to be negligible even with $\omega_1 \neq \omega_2$. The following important result derivable from this theorem assumes a zero or negligible right-hand side.

Figure 3:
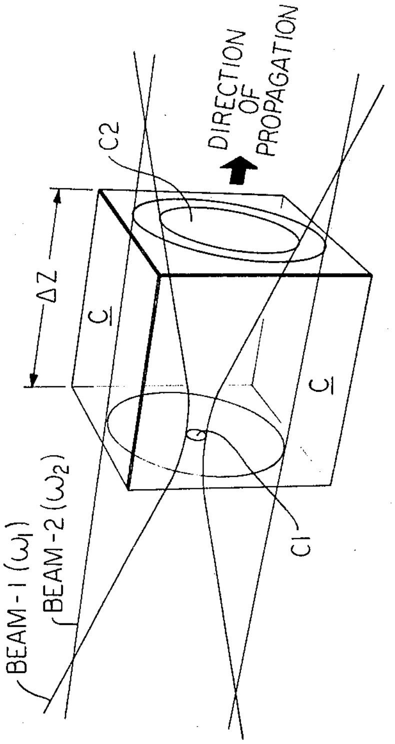
FIG. 3 shows a volume through which a pair of beams are propagating, this figure being useful in the following description.
Figure 3:
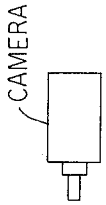

Consider, as shown in FIG. 3, a volume through which the combined beams are propagating. Let $C_1$ contain all of the surface $C$ common to the two beams as they propagate into the volume, and $C_2$ contain all of $C$ common to the beams as they leave. Then, by definition, the vector product is zero everywhere except over regions of $C_1$ and $C_2$, and Equation (4) can be written as:

$$\iint_{C_1} (\vec{E}_1 \times \vec{H}_2^* + \vec{E}_2^* \times \vec{H}_1) \cdot d\vec{A} + \iint_{C_2} (\vec{E}_1 \times \vec{H}_2^* + \vec{E}_2^* \times \vec{H}_1) \cdot d\vec{A} = 0 \quad (6)$$

Taking into account the relative directions of the vector products and the surface normals at $C_1$ and $C_2$ leads to the conclusion that a detector intercepting the beams crossing $C_2$ yields identically the same output as a similar detector intercepting the beams crossing $C_1$. Since the separation of $C_1$ and $C_2$ is arbitrary, the detector output is independent of its location, provided all of the area common to both beams is intercepted.

With no need, therefore, to either carefully position the detector or require its surface to conform to the locus of the scanning beam waist, it can be located away from the focus (i.e., at an arbitrary out-of-focus position), thereby reducing, by orders of magnitude, the peak instantaneous power densities at this surface. In addition, the effects of dust particles and other local anomalies of the detector surface are considerably reduced by an out-of-focus location. In all cases, the equivalent hologram is made at the locus of the scanning beam waist, independent of the actual detector position.

It will be apparent from the above that the photodetectors 18 and 19 need not be spaced equivalent distances from the beamsplitter 17. That is, the detectors can be asymmetrically positioned without affecting, in any way, the output of the balanced modulator.

The output signal from the difference amplifier 28 is amplified and delivered to the sync insert circuit 29 which, as the name implies, serves to insert the appropriate synchronization pulses into the outgoing signal. These sync pulses are readily derived from the deflection apparatus 23, 24.

The composite output signal, from sync insert 29, is transmitted to remote receiver apparatus via a transmission facility such as a coaxial cable or a radio relay system. The receiver apparatus in general comprises no part of the present invention and hence the same is shown and described only in brief detail herein. Typical receiver apparatus is shown in FIG. 1B to comprise input RF and IF circuits 31, detector and video circuits 32, kinescope 33, a sync pulse separator 34 which serves to separate the horizontal and vertical sync pulses from the video and from each other (relying on their respective time durations), and horizontal and vertical deflection sweep circuits 35 and 36, respectively. The video is delivered to the grid of the kinescope 33 where it serves to modulate the electron beam in intensity in accordance with the received video, i.e., the holographic information signals. The horizontal and vertical sync pulses, in the received composite signal, are coupled to the deflection sweep circuits 35 and 36, respectively, and the latter in response thereto serve to deliver appropriate sweep signals to their respective deflection coils so as to generate a raster scan which corresponds to the scan of the reference beam at the transmitter. The hologram pattern thus displayed on the screen of the kinescope is then photographed and the resulting transparency is used for holographic reconstruction in the manner to be described. The circuitry associated with the kinescope display is conventional to television systems and has been extensively described in the literature; see, for example, "*Television Standards and Practice*," edited by D. M. Fink, McGraw-Hill Book Co., Inc. (1943) and "*Electronic and Radio Engineering*" by F. E. Terman, McGraw-Hill Book Co., Inc. (1955), Fourth Edition, page 991 et seq.

Because the kinescope raster scan matches the scan of the reference beam at the transmitter and the horizontal and vertical optical deflectors 23, 24 are both operated in a free-running mode, the kinescope display has random interlace. This random interlace causes the scanning lines to be smeared together, thereby reducing the visibility of the same. In conjunction with a multifield time exposure, this interlace serves to eliminate the scanning structure in the final hologram. An equivalent advantage may be achieved by using a long persistence display screen instead of a long time exposure.

The reconstruction process is carried out by means of the technique set forth in the article "Hologram Transmission via Television" by Enloe et al., Bell System Technical Journal, Vol. 45, No. 2, Feb. 1966, pages 335–339. Briefly, the holographic transparency is illuminated by collimated coherent light and spatial filtering is done in the Fourier transform plane. The output of the spatial filter is then reimaged by a lens system located intermediate the observer and the transform plane. The reconstruction process comprises no part of the present invention.

Position dependent modulations of the scanning beam are caused by dust and imperfections on the beamsplitter and detector surfaces as well as multiple reflections. The poor impedance match between silicon, for example, and air causes considerable reflections at the detector surfaces. When conditions are right for this reflected light to be returned to a detector surface by a second reflection at some other optical surface, a modulation of the detector output in synchronism with the scanning spot position results. Either of these effects produce on the display kinescope a stationary pattern which can be distinguished from a true hologram by its presence in the absence of the object beam. Such position dependent modulations can be greatly attenuated by photographing the kinescope display with a double exposure technique: half of the necessary exposure is made in the usual way, while for the remainder the reference beam path is lengthened by an odd multiple of half wavelengths and the gain of the final video amplifier 30 is reversed in sign. This combination of optical and electrical phase shifts leaves unchanged those components of the video signal arising from interference between the object and reference beams, but reverses the polarity of the position dependent modulations. The latter modulations during the second exposure period thus cancel those of the first, leaving only the desired object-reference beam interference terms. The reference beam path can be lengthened electrically (by the application of a DC bias to the coil of the Doppler mirror drive 22) or mechanically (by physically shifting mirror positions in the reference beam path).

It has been tacitly assumed but not really required that the subject be two-dimensional. In actuality, this assumption is unnecessary and the subject under investigation may comprise more complicated, three-dimensional objects.

The kinescope-camera display arrangement is disclosed herein primarily for purposes of illustrating the present invention. A kinescope-camera arrangement, though easily implemented, is not only limited in its resolution capability, but also is unsuited for real time operation. In practice, a receiver operating on the "Eidophor" principle will prove more advantageous for normal display purposes and will not only solve the real time problem but the resulting phase holograms will also provide increased optical efficiency in reconstruction. For a brief description of the Eidophor arrangement see the article "The Fischer Large-Screen Projection System (Eidophor)" by E. Baumann, *Journal of SMPTE*, Vol. 60, Apr. 1953, pages 344–356.

One of the uses proposed for holographic scanners is in a real time three-dimensional television system. In such a system the subject scene is successively and continuously scanned in raster fashion and at the receiver the holographic information is displayed a frame at a time. A number of proposals of this nature have been made heretofore by others. It will be apparent, therefore, that while the present invention has not been disclosed in such a system environment, the same has direct applicability thereto and a real time three-dimensional television system incorporating the principles and features of the invention is within the skill of those in the art. Accordingly, it is to be understood that the above-described embodiment is merely illustrative of the invention and numerous modifications or alterations may be made therein without departing from the spirit and scope of the invention.

What is claimed is:

1. A holographic heterodyne scanner comprising means for illuminating a subject with a stationary coherent light beam, photodetector means, a beamsplitter positioned to optically relay the subject illuminating beam toward said photodetector means, means for deriving a reference beam which is doppler-shifted and thereby phase-locked with respect to the subject-illuminating beam, means for focusing said reference beam, the focused reference beam also being optically relayed by said beamsplitter to said photodetector means, said photodetector means being disposed at an out-of-focus location with respect to the waist of the focused reference beam, and means for raster scanning the waist of said reference beam with respect to the optically relayed subject-illuminating beam.

2. A holographic scanner as defined in claim 1 wherein said photodetector means is positioned so as to intercept all of the area common to the two incident beams.

3. A holographic scanner as defined in claim 2 wherein the means for deriving the doppler-shifted reference beam comprises a mirror for reflecting incident light and an electrodynamic movement means for moving said mirror axially with regard to said incident light to thereby doppler-shift the same.

4. A holographic scanner as defined in claim 3 wherein said photodetector means comprises a pair of orthogonally disposed photodetectors connected in a balanced modulator configuration.

5. A holographic scanner as defined in claim 2 wherein said raster scan is of a random interlaced nature.

6. In combination with the holographic scanner as defined in claim 5, a kinescope display means, means for delivering the holographic information output signal of the photodetector means to said kinescope display means to provide a video display of said holographic information, and means providing a multifield time exposure of said video display.

7. The combination as defined in claim 6 including means for substantially eliminating position dependent modulations from said exposure.

* * * * *